United States Patent Office 2,883,299
Patented Apr. 21, 1959

2,883,299

CELLULOSE PROPIONATE COMPOSITIONS

Paul W. Kinney, Cranford, and John H. Prichard, Springfield, N.J., assignors to Celanese Corporation of America, New York, N.Y., a corporation of Delaware No Drawing. Application February 1, 1956
Serial No. 562,659

6 Claims. (Cl. 106—180)

This invention relates to cellulose propionate compositions and relates more particularly to cellulose propionate compositions plasticized with triethylene glycol dicaprylate.

An important object of this invention is to provide plasticized cellulose propionate compositions having superior properties.

A further object of this invention is to provide cellulose propionate compositions plasticized with triethylene glycol dicaprylate.

Other objects of this invention will be apparent from the following detailed description and claims.

According to this invention, it has been found that cellulose propionate compositions plasticized with triethylene glycol dicaprylate have superior properties. Thus, these compositions exhibit high impact strength, good hardness and superior dimensional stability. In addition, they show only a slight loss in weight on heating and no exudation of the plasticizer occurs even under conditions of high temperature and humidity. The triethylene glycol dicaprylate is compatible with the cellulose propionate over a wide range of proportions and may, accordingly, be used to prepare compositions exhibiting different hardness and flow temperatures. Furthermore, the triethylene glycol dicaprylate is inexpensive and readily available. The combination of good properties achieved with the cellulose propionate plasticized with the triethylene glycol dicaprylate is most surprising since cellulose propionate plasticized with other plasticizers commonly used for plasticizing cellulose esters, such as dibutyl phthalate, dioctyl phthalate, triphenyl phosphate, glyceryl tripropionate and the like, give compositions exhibiting either inferior impact strength, poor dimensional stability, or both.

In carrying out this invention, compositions having the best properties are obtained when there is employed a cellulose propionate having from 0.10 to 0.50 or, preferably, from 0.15 to 0.35, free hydroxyl groups per anhydroglucose unit in the cellulose molecule. Compositions prepared with cellulose propionate having a lower content of free hydroxyl groups are characterized by poorer moldability, lower impact strength and poorer dimensional stability. Compositions prepared with cellulose propionate having a higher content of free hydroxyl groups, on the other hand, show much greater sensitivity to water which results in a significantly greater tendency for such compositions to warp or distort at high relative humidities. Such compositions also exhibit a much poorer plasticizer retentivity so that the plasticizer tends to exude therefrom, particularly under conditions of high temperature and humidity. In addition, cellulose propionate having a free hydroxyl content lying outside the ranges specified is significantly more difficult to compound with the plasticizer on hot rolls, in a Banbury mixer, or the like. For best results, the cellulose propionate viscosity, as measured at 25° C. on a solution of 6 grams of the cellulose propionate dissolved in 100 ml. of a mixture of 98 parts of acetone and 2 parts of water, should range from 40 to 250 centipoises or, preferably, from 70 to 120 centipoises. The triethylene glycol dicaprylate should be added to the cellulose propionate in amounts ranging from 5 to 35 parts by weight or, preferably, from 7.5 to 30 parts by weight, for each 100 parts by weight of cellulose propionate. At the upper portions of the range of plasticizer content, the plasticized cellulose propionate will be softer and have a lower flow temperature, but will exhibit a higher impact strength. At the lower portions of the range, the converse will be true.

The triethylene glycol dicaprylate may be incorporated into the cellulose propionate in any desired manner, for example, by working the same on hot rolls. It may also be incorporated into the cellulose propionate by dissolving the same in a common solvent. The cellulose propionate compositions may contain, in addition to triethylene glycol dicaprylate, pigments, dyestuffs, stabilizers, fire-retardants, ultra-violet light absorbers and other substances capable of changing the properties or appearance of the final product.

The following examples are given to illustrate this invention further.

Example I

Cellulose propionate containing 0.25 free hydroxyl groups per anhydroglucose unit and having a viscosity of 115 centipoises in the form of a fine powder has added thereto, for each 100 parts by weight of cellulose propionate, 17.5 parts by weight of triethylene glycol dicaprylate and the whole is worked up on hot rolls until a homogeneous product is achieved. The composition so obtained has a flow temperature of 167° C. (ASTM D–193–55), an Izod impact strength of 8.5 foot pounds (ASTM D–256–47T, Method A), a surface hardness of 65 Rockwell-R-Scale (ASTM D–785–51), a weight loss of 0.7% on heating (ASTM D–706–51T), and no exudation of plasticizer when stored for 72 hours at 140° F. and 90% relative humidity. Molded bars of the plasticized cellulose propionate ⅛ inch by ½ inch by 5 inches are preconditioned for 48 hours at 73° F. and 50% relative humidity and their length accurately measured. The preconditioned bars are then cycled five times as follows: 16 hours at 120° F. and 86% relative humidity, 7 hours at 160° F. and prevailing room humidity, 1 hour at 73° F. and 0% relative humidity. The bars are then reconditioned for 48 hours at 73° F. and 50% relative humidity and their length again measured. The bars show a shrinkage of only 0.5%. The bars are then subjected to five additional cycles as specified above and reconditioned. The bars show a total shrinkage of only 0.7%. During the entire shrinkage test, the bars show a deviation from flatness of less than 0.02 inch.

Example II

The cellulose propionate of Example I is compounded with, for each 100 parts by weight of cellulose propionate, 15 parts by weight of triethylene glycol dicaprylate. The properties of this composition are then measured in the manner described in Example I. The composition has a flow temperature of 169° C., an Izod impact strength of 6.6 foot pounds, and a surface hardness of 77 Rockwell-R-Scale. On testing this composition for shrinkage it shows a shrinkage of 0.3% in length after 5 cycles and 0.6% in length after 10 cycles.

Example III

Cellulose propionate containing 0.30 free hydroxyl groups per anhydroglycose unit and having a viscosity of 100 centipoises is compounded in the manner described in Example I, with triethylene glycol dicaprylate in the proportions of 30 parts of the plasticizer for each 100 parts of the cellulose propionate. The properties of this composition are then measured in the manner described in Example I. The composition has a flow temperature of 155° C., an Izod impact strength of 8.1 foot pounds, a weight loss on heating of 1.9% and a shrinkage, after 5 cycles of 0.1%.

It is to be understood that the foregoing detailed description is given merely by way of illustration and that many variations may be made therein without departing from the spirit of our invention.

Having described our invention, what we desire to secure by Letters Patent is:

1. Cellulose propionate plasticized with for each 100 parts by weight of cellulose propionate between 5 and 35 parts by weight of triethylene glycol dicaprylate.

2. Cellulose propionate having between 0.10 and 0.50 free hydroxyl groups per anhydroglycose unit in the cellulose molecule plasticized with for each 100 parts by weight of cellulose propionate between 5 and 35 parts by weight of triethylene glycol dicaprylate.

3. Cellulose propionate having between 0.15 and 0.35 free hydroxyl groups per anhydroglucose unit in the cellulose molecule plasticized with for each 100 parts by weight of cellulose propionate between 7.5 and 30 parts by weight of triethylene glycol dicaprylate.

4. Cellulose propionate having between 0.10 and 0.50 free hydroxyl groups per anhydroglucose unit in the cellulose molecule and a viscosity between 40 and 250 centipoises plasticized with for each 100 parts by weight of cellulose propionate between 5 and 35 parts by weight of triethylene glycol dicaprylate.

5. Cellulose propionate having between 0.15 and 0.35 free hydroxyl groups per anhydroglucose unit in the cellulose molecule and a viscosity of between 70 and 120 centipoises plasticized with for each 100 parts by weight of cellulose propionate between 7.5 and 30 parts by weight of triethylene glycol dicaprylate.

6. Cellulose propionate having between 0.10 and 0.50 free hydroxyl groups per anhydroglucose unit in the cellulose molecule plasticized with for each 100 parts by weight of cellulose propionate between 5 and 35 parts by weight of triethylene glycol dicaprylate.

References Cited in the file of this patent

UNITED STATES PATENTS

| | | |
|---|---|---|
| 1,944,887 | Graves | Jan. 30, 1934 |
| 2,207,702 | Straughn | July 16, 1940 |
| 2,386,534 | Barsky | Oct. 9, 1945 |
| 2,439,281 | Barsky | Apr. 6, 1948 |

FOREIGN PATENTS

| | | |
|---|---|---|
| 661,639 | Great Britain | Nov. 21, 1951 |